Patented May 16, 1950

2,508,036

UNITED STATES PATENT OFFICE 2,508,036

COMPOUNDS HAVING HIGH WETTING ACTIVITY AND PROCESS FOR PREPARING THEM

Milton Kosmin, Los Angeles, Calif., assignor to Monsanto Chemical Company, St. Louis, Mo., a corporation of Delaware No Drawing. Application November 19, 1947, Serial No. 787,032

5 Claims. (Cl. 260—615)

The present invention relates to compounds having high wetting activity, which compounds are materials of the polyglycol ether type.

It is known, according to the disclosure of U. S. Patent 1,970,578, that straight chain organic alcohols may be reacted with ethylene oxide to produce polyglycol ethers. It is furthermore pointed out in the above patent that these materials may have use as surface active materials, including wetting-out activity, useful for treating textile products. After preparing and testing straight chain polyglycol ethers, according to the prior known methods, I have found that these materials do not possess a sufficiently high activity as wetting agents to make their use for this purpose of commercial value.

I have now found, however, that if in place of the straight chain alcohols previously employed, I employ 2-n-propyl-heptanol and condense the same with ethylene oxide so that at least 5 moles, but less than 16 moles, of ethylene oxide are combined as the polyglycol ether radical, I obtain a series of products exhibiting greatly improved wetting properties in aqueous solution. The material may be employed in any suitable concentration. The improvement manifests itself throughout the range of compositions produced from 5 moles of ethylene oxide per mole of alcohol to and including 15 moles of ethylene oxide per mole of alcohol, the improvement commencing sharply when the composition contains 5 moles of condensed ethylene oxide per mole of alcohol and ending sharply when 15 moles of ethylene oxide are condensed per mole of alcohol.

The present compounds are believed to have the structural formula indicated below:

$$CH_3CH_2CH_2CH_2CH_2CHCH_2OC_2H_4-(C_2H_4O)_nC_2H_4OH$$
$$|$$
$$CH_2CH_2CH_3$$

where $n$ is an integer having a value of from 3 to 13.

The improvement in surface activity may be illustrated by comparing the speed of wetting as measured by the well known Draves test upon aqueous solutions of the present and related materials. In the tabulation below is shown the speed of wetting in seconds as measured by the Draves test upon water solutions of 0.25% by weight concentration of each of the products described herein. Obviously other suitable concentrations may be employed.

| Product Tested | Speed of Wetting |
|---|---|
| | Seconds |
| n-Decanol+5 moles Ethylene Oxide | 1.0 |
| n-Decanol+10 moles Ethylene Oxide | 16.2 |
| n-Decanol+15 moles Ethylene Oxide | 60.1 |
| 2-n-Propyl-heptanol+5 moles Ethylene Oxide | Instant |
| 2-n-Propyl-heptanol+10 moles Ethylene Oxide | 1.0 |
| 2-n-Propyl-heptanol+15 moles Ethylene Oxide | 7.0 |

The products are produced according to the methods illustrated in the following examples:

Example 1

One gram mole of 2-n-propyl-heptanol is placed in a container, then heated to 155–160° C. 0.2% solid KOH is added and then a stream of gaseous ethylene oxide is passed into the heated alcohol. The addition of ethylene oxide is continued in this manner until a total of 5 gram moles, as determined by increase in weight, has combined with the alcohol. The reaction is then stopped by discontinuing the flow of ethylene oxide and the product removed from the reaction vessel. The product is a yellow, low-melting solid, freely soluble in water and exhibiting exceedingly rapid wetting properties. When dissolved in water in amount sufficient to form a 0.25% solution, the solution so prepared possessed an instant wetting speed in the Draves test.

The product produced according to this example has the structural formula:

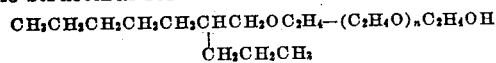

Example 2

One gram mole of 2-n-propyl-heptanol was placed in the container employed in Example 1, heated to a temperature of 150° to 160° C. 0.25% of solid KOH was added and a stream of gaseous ethylene oxide was passed into a heated alcohol. The addition of ethylene oxide was continued until a total of 10 gram moles of ethylene oxide, as determined by increase in the weight, had combined with the alcohol. The reaction is then discontinued and the product removed from the reaction vessel. The product is a yellow, low-melting solid, freely soluble in water and when dissolved in water to form a 0.25% solution the solution possessed a Draves wetting time of one second.

The product produced according to this example has the structure:

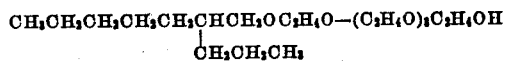

Example 3

One gram mole of 2-n-propyl-heptanol is condensed with ethylene oxide in the same manner as disclosed in Example 1 above, with the exception that the treatment with ethylene oxide is continued until a total of 15 moles of ethylene oxide has combined. The product is a yellow, low-melting solid, freely soluble in water and exhibits a wetting speed in the Draves test of 7.0 seconds.

The product produced according to this example has the structural formula:

$$CH_3CH_2CH_2CH_2CH_2CHCH_2OC_2H_4O-(C_2H_4O)_{11}C_2H_4OH$$
$$|$$
$$CH_2CH_2CH_3$$

The above products may also be employed as efficient detergents for the washing of soiled textile products. When so employed they may be utilized directly as produced in the above examples or they may be combined with builders such as the various alkali metal salts, particularly the alkaline phosphates and employed in the built form.

What I claim is:

1. Chemical compounds having the formula:

$$CH_3CH_2CH_2CH_2CH_2CHCH_2OC_2H_4O-(C_2H_4O)_nC_2H_4OH$$
$$|$$
$$CH_2CH_2CH_3$$

where $n$ is an integer having a value of from 3 to 13.

2. The chemical compound having the formula:

$$CH_3CH_2CH_2CH_2CH_2CHCH_2OC_2H_4O-(C_2H_4O)_3C_2H_4OH$$
$$|$$
$$CH_2CH_2CH_3$$

3. The chemical compound having the formula:

$$CH_3CH_2CH_2CH_2CH_2CHCH_2OC_2H_4O-(C_2H_4O)_7C_2H_4OH$$
$$|$$
$$CH_2CH_2CH_3$$

4. The chemical compound having the formula:

$$CH_3CH_2CH_2CH_2CH_2CHCH_2OC_2H_4O-(C_2H_4O)_{11}C_2H_4OH$$
$$|$$
$$CH_2CH_2CH_3$$

5. The process which comprises passing ethylene oxide into 2-n-propyl-heptanol until at least 5 moles and less than 16 moles of ethylene oxide have combined with each mole of said 2-n-propyl-heptanol.

MILTON KOSMIN.

REFERENCES CITED

The following references are of record in the file of this patent:

UNITED STATES PATENTS

| Number | Name | Date |
|--------|------|------|
| 2,355,823 | Schlegel | Aug. 15, 1944 |
| 2,359,750 | Collins | Oct. 10, 1944 |

FOREIGN PATENTS

| Number | Country | Date |
|--------|---------|------|
| 584,367 | Great Britain | Jan. 14, 1947 |